United States Patent [19]

Thörmer et al.

[11] 4,190,613

[45] Feb. 26, 1980

[54] SEPARATING AGENT FOR RUBBER POWDERS

[75] Inventors: Joachim Thörmer, Leverkusen; Jochen Schnetger, Odenthal-Hoeffe; Gerhard Giersiepen, Leichlingen; Wilhelm Göbel, Leverkusen, all of Fed. Rep. of Germany

[73] Assignee: Bayer Aktiengesellschaft, Leverkusen, Fed. Rep. of Germany

[21] Appl. No.: 835,298

[22] Filed: Sep. 21, 1977

Related U.S. Application Data

[63] Continuation-in-part of Ser. No. 811,144, Jun. 28, 1977, abandoned.

[30] Foreign Application Priority Data

Jul. 2, 1976 [DE] Fed. Rep. of Germany ....... 2629705

[51] Int. Cl.² .......................... C08L 9/02; C08L 9/06; C08L 11/00
[52] U.S. Cl. .................................. 525/215; 525/222; 525/223; 525/224

[58] Field of Search .................. 260/876 R, 893, 892, 260/887, 890, 897 B

[56] References Cited

U.S. PATENT DOCUMENTS

| | | | |
|---|---|---|---|
| 2,593,681 | 4/1952 | Leydon | 260/33.6 A |
| 2,776,270 | 1/1957 | Coover, Jr. et al. | 260/876 R X |
| 3,090,763 | 5/1963 | Hillier | 260/23 |
| 3,145,189 | 8/1964 | Fourier | 260/892 X |
| 3,192,176 | 6/1965 | Mielke | 260/887 |
| 3,671,607 | 6/1972 | Lee | 260/876 R |
| 3,839,503 | 10/1974 | Kahle et al. | 260/893 X |
| 3,864,432 | 2/1975 | Adler | 260/887 |
| 3,875,259 | 4/1975 | Yoshida et al. | 260/876 R |
| 3,886,231 | 5/1975 | Nield | 260/876 R |
| 4,126,647 | 11/1978 | Howard | 260/897 B |

*Primary Examiner*—Paul Lieberman
*Attorney, Agent, or Firm*—Connolly and Hutz

[57] ABSTRACT

A freeflowing rubber mixture which is stable against coalescence and cohesion comprising a vulcanizable rubber in powder form and a minor amount of an acrylonitrile polymer as a separating agent.

5 Claims, No Drawings

SEPARATING AGENT FOR RUBBER POWDERS

This application is a continuation-in-part of application Ser. No. 811,144 filed June 28, 1977, now abandoned.

It is known that rubber powders can be produced by spray-drying a latex or by grinding solid rubber. In either case, the fluidity of the rubber powder, once it has been produced, has to be kept intact by the presence of separating agents which prevent coalescence and cohesion. The quantity in which the separating agent is added is, of course, dependent upon the tackiness of the rubber and upon the effectiveness of the additive. Thus, the spray drying of a latex in the presence of at least 10% by weight of diatomaceous earth is described in U.S. Pat. Nos. 2,315,924 and 3,194,781. In addition to heterogeneous additives, powder-form rubbers of the type in question also contain considerable quantities of emulsifiers arising from their production which are potentially detrimental to the properties of the materials produced from the rubber. The relatively high degree of swelling which vulcanisates such as these undergo in water is mentioned as an example. According to British Patent Specification No. 1,079,976, a rubber powder is obtained by using a polysaccharide, especially starch, and an inorganic additive, especially talcum. In addition, U.S. Pat. Nos. 1,215,918; 1,204,405 and 1,148,348 and British Patent Specification No. 1,113,348 describe processes for the production of powder-form rubber which, through anti-sticking agents added to the latex in certain precipitation and working-up processes, are said to produce the powder-form rubber, precipitated in powder or granular form, in that condition.

Another possible method of producing powder-form rubber is to start with the solution polymer. In this method, which is described in DT-OS No. 2,214,121, more or less large quantities of fillers and emulsifiers are adding during the process which is terminated by a precipitation step.

In addition, solid rubber has already been ground below its glass temperature for the production of rubber powder (Journal of Applied Science, 10 (1966), pages 955–959).

In the above-mentioned processes, which generally start with the latex of an emulsion or solution polymer, more or less heterogeneous additives are worked into the rubber, for example by spray drying. Unfortunately, the relatively large quantities of additives required for maintaining a high degree of fluidity affect the character of the rubber and its processing and vulcanisation properties.

All conventional methods for the production of rubber powder require relatively large quantities of heterogeneous additives so that inter alia the choice of the separating agents is of critical signficance so far as the further processing of the powders is concerned. In particular, inorganic lubricant powders alter certain raw material properties such as by producing high ash levels, but above all—especially in cases where the powder-form rubber is further processed in solution (for example for producing adhesives)—because they are insoluble or swellable in solvents and precipitate from the solutions.

Organic separating agents can also have the disadvantage that they adversely affect the vulcanisate values of elastomers in regard to their resistance to swelling in water and in industrial oils and also in machine and engine oils, or they are dissolved by the corresponding medium and contaminate it, so that secondary damage can be caused. Another disadvantage of the separating agent described in the literature is, for example, the fact that they are not heat-resistant and either soften or give off aggressive substances or are destroyed by atmospheric oxygen. For example, the addition of polyvinyl chloride as a separating agent for powder-form nitrile rubber has long been known and is used on a commercial scale for the production of powder-form rubbers. Unfortunately, the addition of PVC limits the usefulness of an elastomer. The properties of ethylene-vinyl acetate copolymers or even heat-stabilised acrylonitrile-butadiene rubber vulcanisates would be greatly affected by the addition of PVC and their range of industrial applications would be severely restricted.

It has now been found that polyacrylonitrile (PAN) is a suitable separating agent in many respects. Polyacrylonitrile has the advantage from the commercial point of view that as an organic substance it is obtained during polymerisation in such a fine particle size of from 5 to 150$\mu$ that it may be directly used without any need for further size reduction. A polyacrylonitrile powder having a grain size distribution of from 10 to 80$\mu$ is particularly suitable. The polyacrylonitrile has a molecular weight of from 60.000 to 200.000 and preferably of from 140.000 to 180.000 (weight average).

The present invention relates to a freeflowing rubber mixture which is stable against coalescence and cohesion comprising a vulcanisable rubber in powder form and from 3 to 12% by weight, based on the rubber, of polyacrylonitrile.

The polyacrylonitrile unexpectedly has an excellent effect as separating agent. In addition to this, it is heatresistant and behave favourably in contact with liquid media. It does not dissolve or swell in apolar or substantially apolar liquids such as, for example, industrial oils, so that it may be used in elastomers of the type employed for the production of adhesives. Completely clear or clouded solutions are obtained, according to the polarity of the solvent used. The separating agent is swollen and shows no tendency towards sedimentation in these solutions.

This applies in particular to so-called special elastomers, such as nitrile rubber, ethylene-vinyl acetate elastomers and other elastomers, such as polychloroprene for example, which are only soluble in polar solvents.

Unexpectedly, the separating agent is also highly effective in apolar elastomers such as polybutadiene and styrenebutadiene rubber with high cold flow, so that powderform rubbers with extremely good free-flow properties are obtained.

According to the present invention any natural or synthetic rubber may be stabilized against coalescence and cohesion. Suitable synthetic rubbers are homo- or copolymers of conjugated dienes having from 4 to 8 carbon atoms and of the corresponding monomers wherein one or more of the hydrogen atoms have been replaced by halogen atoms. Examples for such monomers are butadiene, isoprene, dimethyl butadiene, 2-chlorobutadiene (chloroprene) and 2,3-dichloro butadiene. Likewise suitable are copolymers of these monomers with vinyl aromatic compounds like styrene and $\alpha$-methyl styrene, acrylonitrile and methacrylonitrile. Other suitable synthetic rubbers are ethylene propylene terpolymers and copolymers of ethylene with vinyl esters of $C_2$–$C_{20}$-alkane carboxylic acids. Polychloroprene and copolymers of ethylene with vinyl acetate, butadiene with styrene and butadiene with acrylonitrile are preferred. In the rubber mixtures according to the present invention the rubber particles have a grain size of from 1 to 3000μ preferably from 5 to 1600μ.

Unexpectedly, the vulcanisation rate is also unaffected by PAN. It may even be increased and not decreased as is the case with some inorganic separating agents.

Another advantage of polyacrylonitrile as a separating agent is above all the fact that the addition of PAN produces hardly any changes in the properties, especially the Mooney viscosities, of the raw materials.

The separating agent may be worked into the rubber, for example during a grinding process, by precipitation processes or during spray drying. It is generally added in a quantity of from 3 to 12% by weight and preferably in a quantity of from 3 to 7% by weight, based on the weight of rubber.

When the polyacrylonitrile was added in conjunction with other separating agents, for example zinc or calcium salts of fatty acids, it was not possible to observe any adverse effects upon the maintenance of fluidity. In cases such as these, the quantity in which the separating agent according to the invention is added may frequently be reduced.

Further additives which may be present in an amount of from 3 to 12% by weight, based on rubber, in the rubber mixtures according to the present invention are separating agents, fillers and other additives known in the art, for example metal oxides like siliciumdioxide, titanium dioxide and magnesium oxide; carbon black; talcum, diatomaceous earth, kaolin, silicic acid and salts of stearic acid like zinc stearate and calcium stearate.

EXAMPLE 1

An ethylene-vinyl acetate copolymer with a vinyl acetate content of 45% by weight and a Mooney viscosity of 22 ME was ground in the presence of 4% by weight of polyacrylonitrile (PAN, particle size 10–80μ, molecular weight approx. 160.000, in an industrial 45 kilowatt baffle-plate impact mill. The rubber powder obtained had a pack strength (determined in accordance with ASTM-D 1937-62 T) of 30 lbs. The material showed excellent fluidity which it retained for several months.

| Grain size distribution of the rubber powder: | 0–0.5 mm = 21% |
|---|---|
| | 0.5–1 mm = 41% |
| | 1–1.5 mm = 38% |

The physical properties of a peroxidically crosslinked vulcanisate produced from the rubber powder were substantially unchanged in comparison with a vulcanisate of the starting material. There was no evidence of any impairment to the peroxidic crosslinking process.

A slightly clouded rubber solution was obtained in toluene, but no sediment was produced, even after prolonged standing.

EXAMPLE 2

A butadiene-acrylonitrile rubber with an ACN-content of 28% by weight and a Mooney viscosity of 59 ME was ground in the presence of 5% by weight of PAN (particle size 10–80μ, molecular weight approx. 160.000) in the same way as described in Example 1.

A pack strength (determined in accordance with ASTM-D 1937-62 T) of more than 30 lbs was measured for a grain size distribution of the completed powder-form rubber of:

25% less than 0.5 mm
50% from 0.5–1 mm
25% from 1–1.6 mm

A free-flowing rubber powder with extremely good fluidity was obtained. The vulcanisate values of the rubber mixtures produced from this powder were satisfactory.

EXAMPLE 3

Styrene-butadiene rubber (SRR 1500) with a Mooney viscosity of 51 ME was ground in the presence of 7% by weight of PAN (particle size 10–80μ, molecular weight approx. 160.000) in the same way as described in Example 1. A pack strength (ASTM-D 1937-62 T) of more than 30 lbs was obtained.

The vulcanisate properties of the test specimens produced from this rubber powder were satisfactory.

The grain size distribution of the rubber powder was as follows:

24.5% up to 0.5 mm
36.5% from 0.5–1 mm
49.0% from 1–1.5 mm

A free-flowing rubber powder with extremely good fluidity was obtained.

EXAMPLE 4

A polymer of 2-chlorobutadiene with a Mooney viscosity (according to DIN 53 523) ML 4 (100° C.) of 81 was ground in the presence of 5% by weight of polyacrylonitrile (particle sice 10–80μ, molecular weight approx. 160.000) in the same way as described in Example 1. A free-flowing rubber powder with a pack strength of more than 30 lbs was obtained.

We claim:

1. A freeflowing rubber powder mixture which is stable against coalescence and cohesion comprising a vulcanisable rubber in powder form and from 3 to 12% by weight, based on the rubber, of polyacrylonitrile.

2. A rubber mixture according to claim 1 containing 3 to 7% by weight of the polyacrylonitrile.

3. A rubber mixture according to claim 1 wherein the polyacrylonitrile has a particle size of from 10 to 80μ.

4. A rubber mixture according to claim 1 wherein the polyacrylonitrile has a molecular weight of from 60.000 to 200.000 (weight average).

5. A rubber mixture according to claim 1, wherein the rubber is polychloroprene, a copolymer of ethylene and vinyl-acetate or a copolymer of butadiene and styrene or acrylonitrile.